(12) United States Patent
Smith et al.

(10) Patent No.: US 7,890,933 B2
(45) Date of Patent: Feb. 15, 2011

(54) IDENTIFYING PROGRAM PHASE CHANGES THROUGH PROGRAM WORKING SET ANALYSIS

(75) Inventors: James Smith, Madison, WI (US); Ashutosh Dhodapkar, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1773 days.

(21) Appl. No.: 10/772,555

(22) Filed: Feb. 5, 2004

(65) Prior Publication Data

US 2004/0158818 A1 Aug. 12, 2004

Related U.S. Application Data

(60) Provisional application No. 60/445,368, filed on Feb. 5, 2003.

(51) Int. Cl.
G06F 9/44 (2006.01)
G06F 9/45 (2006.01)

(52) U.S. Cl. .................. 717/127; 717/131; 717/154

(58) Field of Classification Search ............ None
See application file for complete search history.

(56) References Cited

U.S. PATENT DOCUMENTS

| | | | |
|---|---|---|---|
| 4,370,711 A | 1/1983 | Smith | |
| 2004/0111708 A1* | 6/2004 | Calder et al. | 717/131 |
| 2004/0216082 A1* | 10/2004 | Sun | 717/100 |
| 2004/0216097 A1* | 10/2004 | Sun | 717/154 |

OTHER PUBLICATIONS

Sherwood et al., "Automatically Characterizing Large Scale Program Behavior", 2002 ACM, pp. 45-57.*
Quinn Able Jacobson, "High-Performance Frontends for Trace Processors", 1999, Univ. of Wisconsin—Madison, pp. 1-225.*
Ashutosh Sham Dhodapkar, "Autonomic Management of Adaptive Microarchitectures", 2004, Univ. of Wisconsin—Madison, pp. 1-154.*
Smith et al., "Dynamic Microarchitecture Adaptation via Co-Designed Virtual Machines", ISSCC 2002, 2002 IEEE, pp. 1-2.*
Dhodapkar et al., "Comparing Program Phase Detection Techniques", Dec. 2003, IEEE, pp. 1-11.*
Dhodapkar et al., "Tuning Reconfigurable Microarchitectures for Power Efficiency", 2004 IEEE, pp. 1-7.*

(Continued)

*Primary Examiner*—Michael J Yigdall
*Assistant Examiner*—Ben C Wang
(74) *Attorney, Agent, or Firm*—Schwegman, Lundberg & Woessner, P.A.

(57) ABSTRACT

The disclosure presents systems and methods to identify program workings sets, detect working set changes and estimate working set sizes. The system generates a highly compressed representation of the working set, called a working set signature, by hashing working set elements into a data structure and setting the entries touched. The working set signature identifies, or is a representation of, the working set. The system can detect a working set change by comparing the signatures of consecutive working sets using a metric called a relative signature distance. The working set size is estimated by counting the number of bits set in the signature. The system can be used to compactly represent various types of working sets such as instruction, data and branch working sets. The system can detect program working set changes (or phase changes) independent of any micro-architectural specification.

23 Claims, 4 Drawing Sheets

OTHER PUBLICATIONS

Balasubramonian, Rajeev, et al., "Memory Hierarchy Reconfiguration for energy and Performance in General-Purpose Processor Architectures", *Proceedings of the 33rd Annual ACM/IEEE International Symposium on Microarchitecture*, (2000),245-257.

Huang, Michael C., et al., "Positional Adaptation of Processors: Application to Energy Reduction", *International Symposium on Computer Architecture*, (2003),1-12.

Sherwood, Timothy, et al., "Automatically Characterizing Large Scale Program Behavior", *10th International Conference on Architectural Support for Programming Languages and Operating Systems (ASPLOS X)*, (Oct. 2002),1-13.

Sherwood, Timothy, et al., "Basic Block Distribution Analysis to Find Periodic Behavior and Simulation Points in Applications", *Proceedings of the International Conference on Parallel Architectures and Compilation Techniques (PACT)*, (Sep. 2001),1-12.

Sherwood, Timothy, et al., "Phase Tracking and Prediction", *Proceedings of the 30th Intenational Symposium on Computer Architecture (ISCA)*, (Jun. 2003),1-12.

* cited by examiner

IDENTIFYING PROGRAM PHASE CHANGES THROUGH PROGRAM WORKING SET ANALYSIS

REFERENCE TO CO-PENDING APPLICATION

This patent application claims priority to co-pending U.S. provisional application for patent filed on Feb. 5, 2003, having Ser. No. 60/445,368 and titled "Systems and Methods for Identifying and Analyzing Program Working Sets." The provisional application is incorporated by reference into this patent application.

FEDERAL GOVERNMENT FUNDING SUPPORT

The inventive subject matter was made with Federal Government funding support by the National Science Foundation, Agency Grant No. CCR-9900610. The Federal Government has certain rights in the inventive subject matter of the present disclosure.

TECHNICAL FIELD OF THE DISCLOSURE

The present disclosure relates generally to computing processors, such as processors used in computer systems, and more specifically to identifying program phases by analyzing working sets.

BACKGROUND

Typical programs operating on computer systems or integrated circuit chips sometimes use computer system resources in inefficient ways, for example, with respect to power and performance. In general, microprocessors in computer systems are designed to provide good average performance over a variety of workloads imposed on them by computer programs. As the program executes it passes through different phases of operation. Hardware resource requirements can differ depending on the phase of the program. If the hardware resources are not large enough then performance can suffer, and if the hardware resources are too large then power is wasted, for example. Performance, power consumption, or both, can be optimized as the program is running, if program phase changes can be detected and dynamic hardware reconfiguration can be invoked in response to phase changes. Although several examples of dynamically configurable hardware are known to address these issues, there is a need for further improvement in this area. Described below are various embodiments of the inventive subject matter that may, among other things, improve management of configurable hardware.

SUMMARY

The disclosure presents systems and methods to identify program workings sets, detect working set changes and estimate working set sizes. The system generates a highly compressed representation of the working set, called a working set signature, by hashing working set elements into a data structure and setting the entries touched. The working set signature identifies, or is a representation of, the working set. The system can detect a working set change by comparing the signatures of consecutive working sets using a metric called a relative signature distance. The working set size is estimated by counting the number of bits set in the signature. The system can be used to compactly represent various types of working sets such as instruction, data and branch working sets. The system can detect program working set changes (or phase changes) independent of any micro-architectural specification. Thus, the system can be applied to any microprocessor without any modifications. Also, the system can be used to directly configure, i.e., without a trial and error process, certain hardware structures whose performance depends on the working set size. Such structures include caches and branch predictors. Also, the system can efficiently identify recurring program working sets using their associated signatures. The system can store signatures and associated optimal configurations for different working sets. When a working set repeats itself during program execution, the system can set the optimal configuration without going through a trial and error process. This can lead to significant reduction in time spent in non-optimal configurations.

DESCRIPTION

This disclosure relates to systems and methods suitable for identifying program phase changes. This is accomplished by analyzing program working sets, or the regions of a program that are being actively used at any given time. The disclosure, including the figures, describes the systems and methods with reference to several illustrative examples. Other examples are contemplated and are mentioned below or are otherwise imaginable to someone skilled in the art. The scope of the invention is not limited to the few examples, i.e., the described embodiments of the invention. Rather, the scope of the invention is defined by reference to the appended claims. Changes can be made to the examples, including alternative designs not disclosed, and still be within the scope of the claims.

Figure 1:
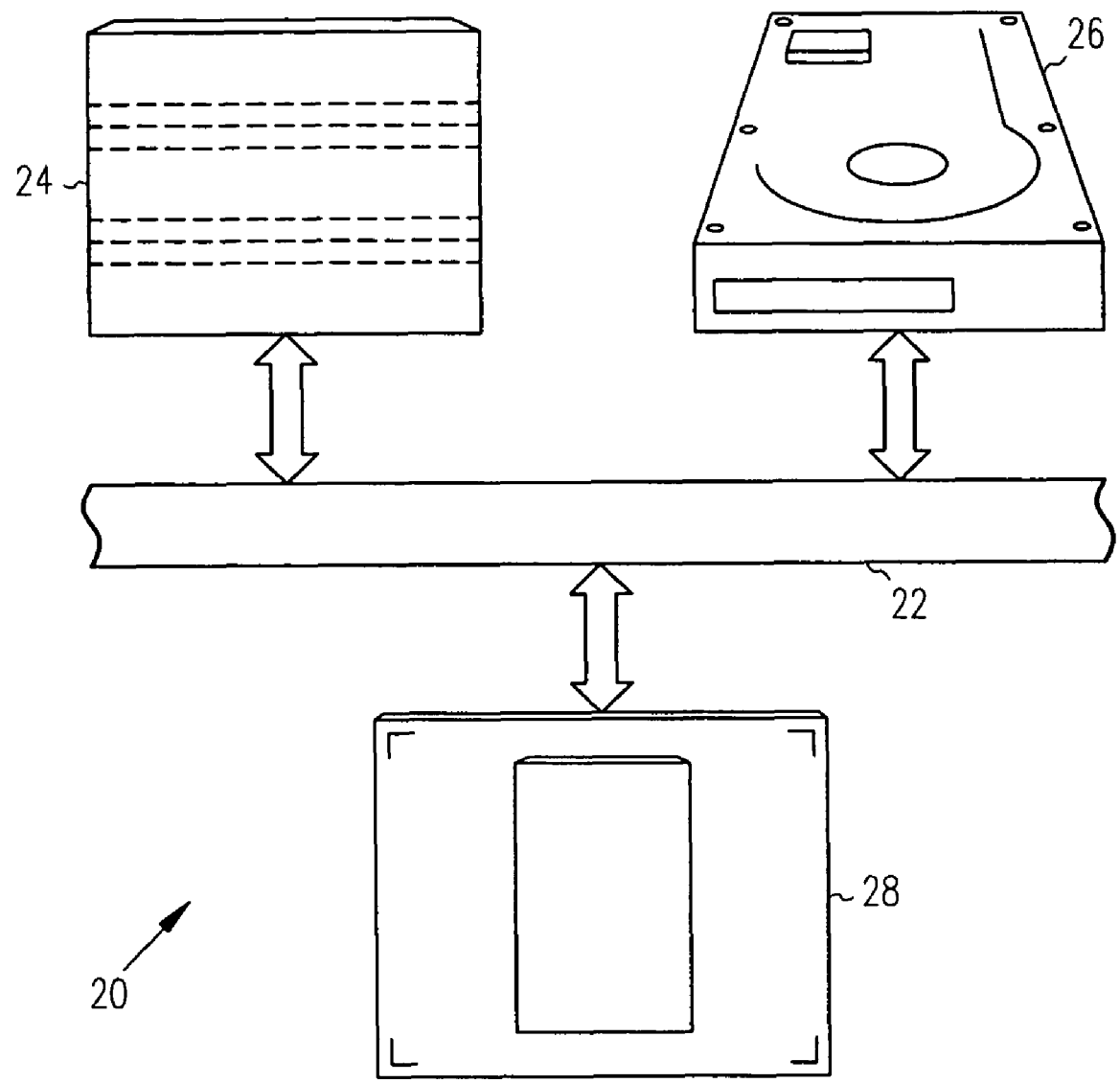
FIG. 1 is a schematic view of an example environment of the present disclosure.

FIG. 1 shows a schematic view of a computer system 20, one example environment of the present disclosure. Computer system 20 comprises several components including a bus 22, a memory 24, a mass storage device 26, and a processor 28. The bus provides communication links between the components in the system 20. An example of the memory 24 is a random access memory (RAM) and examples of the mass storage device 26 include hard disk drives, CD-ROM drives, or the like. In the example, the memory is used to store information such as computer programs and data from device 26 for use by the processor 28.

In a program, a working set $W(t_i, \tau)$ for $i=1, 2 \ldots$, is a set of distinct memory segments $\{s_1, s_2 \ldots s_\omega\}$ accessed over the $i^{th}$ window of size $\tau$, as set forth in A. S. Dhodapkar and J. E. Smith, "Managing Multi-configuration Hardware via Dynamic Working Set Analysis," in *Proc. of the 29$^{th}$ Annual Intl. Sym. on Computer Architecture*, May 2002, pp. 233-244. The window is a sequence off consecutive memory accesses. The working set size is $\omega$, the cardinality of the set of unique segments that are accessed by members of the window. In one example, the segments are memory regions of some fixed size, such as a page. In another example, the segments are memory regions of the size of a cache memory block.

A working set can be associated with a specific type of memory access, or some combination. For example, a working set can correspond to program instructions fetched, in which case it is referred to as an instruction working set. As another example, a working set can correspond to data accessed via load and store instructions, in which case it is referred to as a data working set. As another example, a working set can correspond to fetched branch instructions, in which case it is referred to as a branch working set.

Program phases are related to program working sets, which are indicated above. Phase changes are manifestations of working set changes. In one common definition, a phase is a maximal interval during which a given set of segments stay on top of an LRU stack, as set forth in A. Batson and W. Madison, "Measurements of major locality phases in symbolic reference strings," *Proc. Of the Intl. Sym Computer Performance and Modeling, Measurement and Evaluation*, ACM SIGMETRICS and IFIP WG7.3, March 1976, pp. 75-84. In other words, a phase is defined as the maximum interval over which the working set remains more or less constant. The phase transition model states that programs follow a series of steady state phases with abrupt transitions in between.

The disclosure presents systems and methods to dynamically identify program workings sets, detect working set changes and estimate working set sizes. The system generates a highly compressed representation of the working set, called a working set signature, or simply signature, by hashing working set elements into a data structure, such as a RAM based table, and setting the entries accessed. In one example, the table is reset before signature generation commences. The working set signature identifies, or is a representation of, the working set. In one example, the system detects a working set change by comparing the signatures of consecutive working sets using a metric called a relative signature distance. The working set size is estimated by counting the number of bits set in the signature. The disclosed system can be used to compactly represent various types of working sets such as instruction, data and branch working sets.

The subject matter includes several advantages, and three are listed here. First, the system can be used to detect program working set changes (or phase changes) independent of any hardware specification. Thus, the system can be applied to any microprocessor without any modifications. Second, the system can be used to directly configure, i.e., without a trial and error process, certain hardware structures whose performance depends on the working set size. Such structures include caches and branch predictors. Third, the system can very efficiently identify recurring program working sets using their associated signatures. The system can store signatures and associated optimal configurations for different working sets. When a working set repeats itself during program execution, the system can set the optimal configuration without going through a trial and error process. This can lead to significant reduction in time spent in non-optimal configurations. Overall, the system enables deterministic reconfiguration algorithms compared to prior art. Many more advantages will become apparent to those skilled in the art.

Figure 2:
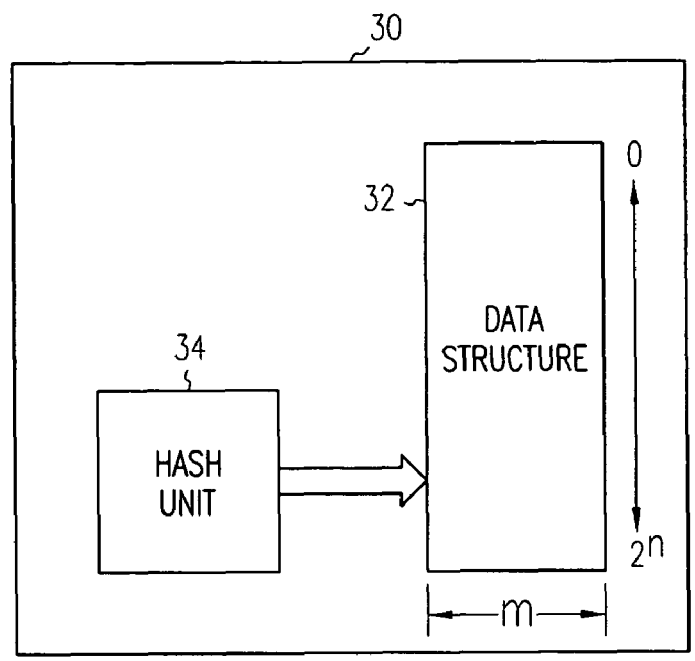
FIG. 2 is a block diagram of an example apparatus or mechanism for identifying a program working set.

FIG. 2 is a block diagram of an example apparatus or mechanism for identifying a program working set by forming a working set signature. In one example, the mechanism 30 is incorporated into the processor 28 of FIG. 1. The mechanism 30 includes a data structure 32 and a hash unit 34 operating a hash function. In one example, the hash function is a pseudo-random hash function; however, embodiments of the inventive subject matter are not limited to any particular hash function. The data structure 32 collects the working set signature. The hash unit 34 uses a hash function to map a plurality of working set elements into the data structure 32. Examples of data structures include tables, arrays, vectors and the like. In one specific example, the data structure is an $2^n \times m$ bit table. In a more specific example, n is in the range of 1 to 20. In a more specific example, the width m is in the range of 1 to 64. In general, there is no limit as to the width of the table or the number of the table entries. The m-bit entry is updated, in one example, with an m-bit saturating counter that is incremented every time the entry is touched. A saturating counter increments until it reaches its maximum value, at which time it remains at the maximum value.

Figure 3:
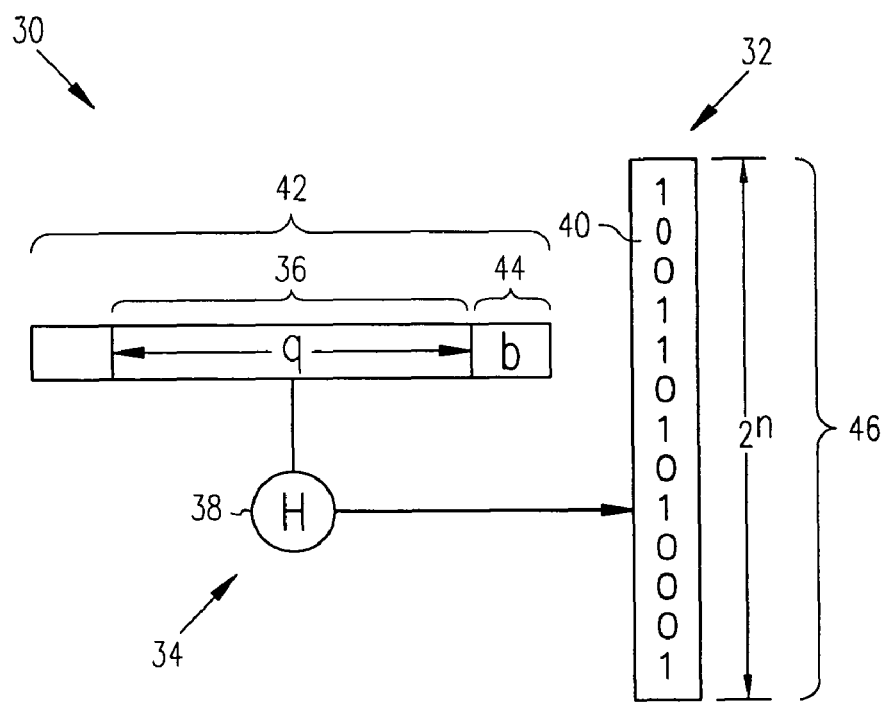
FIG. 3 is a block diagram of a more specific example of an apparatus or mechanism for collecting a representation of the program working set.

An example embodiment of the mechanism for collecting working set signatures is shown in the block diagram of FIG. 3. In the figure, a q-bit working set element 36 is mapped into the data structure 32 with a randomizing hash function 38 to set a bit in the $2^n$-bit table. Several such working set elements are hashed over a fixed interval of program execution to create a working set signature 40. In other words, q bits are selected from the program counter 42 and hashed using the hash function 38 to address a table containing $2^n$ 1-bit entries. For other applications, branch PCs or data addresses can be used. Sampling of the working set can occur at every committed instruction. Alternatively, periodic sampling or random sampling can be used to reduce sampling overhead.

The overhead can be further reduced by increasing the granularity of sampling. For example, caches and predictors can work at the granularity of cache line sized elements (32-256 bytes). In the illustrated example, the working sets are of cache line granularity and thus low-order b address bits 44 are ignored during hashing when the cache line is of size $2^b$.

Capturing the working set in one example includes a window or an interval over which the working set is sampled. The window size determines the phase resolution or the shortest phase that can be identified. Use of a non-overlapping window results in simpler designs.

In the illustrated example, the working set signature 40 is a $2^n$-bit vector 46 formed by mapping the working set elements 36 into $2^n$-buckets using the hash function 38. The size of the bit vector in the illustrated example is in the range of 32-128 bytes (n is in the range of 8-10). It is contemplated that the size can be varied dynamically to suit a particular application. The bit vector 46 can be cleared at the beginning of every window (interval), and a bit is set if the corresponding instruction block is accessed. In another example, the working set signature is saved in some memory for further processing.

The working set signature 40 can be used to estimate the size of the full working set. The size, or number of ones, or the fill-factor, of the signature 40 is probabilistically related to the true working set size. Accordingly, once a working set signature is received and the size of the signature determined, the size of the working set can be estimated because it is related to the size of the working set signature. Various methods can be used to estimate the working set size depending on the degree of accuracy desired.

The working set size can be estimated with a substantial degree of accuracy and in a relatively straightforward manner in one embodiment described here. When K random keys are hashed into $2^n$ buckets, the fraction of buckets filled, f is given by $$f = 1 - \left(1 - \frac{1}{2^n}\right)^K.$$

Given the fraction of the signature filled, the working set size can be estimated using the relation $$K = \log(1-f) \bigg/ \log\left(1 - \frac{1}{2^n}\right).$$

In an example using this relation, a 90% filled table corresponds to a working set size about 2.5 times larger than the number of filled entries. This relationship has been experimentally validated.

A specific implementation of a determination of working set size based on the working set signature includes the use of a counter. In a preferred example, the counter is implemented in hardware. In order to measure size with this implementation, the counter increments whenever a bit in the signature changes from 0 to 1. This implementation reads the signature entry prior to writing to it. Other implementations are contemplated and are intended to be within the scope of the inventive subject matter.

Working set signatures can also be used to detect working set changes and thus phase changes in the program. Working set signatures are representations of the working set so similar working set signatures can be representative of the same working set. Working set signatures that differ can be representative of different working sets, or a working set change. Methods and systems that comparing two or more working set signatures can take many forms. Similarly, methods used to process the results of the comparison can also take many forms. These methods and systems are included within the scope of the inventive subject matter.

In one general example, two working set signatures are compared to one another. If the working set signatures are differ significantly, there is a working set change. If the working set signatures do not differ significantly, there is no working set change. The definition of a significant difference can take various forms.

In one example embodiment, a significant difference is determined by setting a threshold value that is measured against the results of comparing two working set signatures. A comparison where the results exceed the threshold value is indicative of a working set change. Likewise, a comparison where the results do not exceed the threshold value is indicative that the working set is the same.

A more specific example employing threshold values includes using a metric called relative signature distance. Given two working set signatures to compare, the total number of ones in the exclusive OR (XOR) of the signatures is divided by the total number of ones in the inclusive OR (OR) of the signatures to obtain a ratio called a "relative signature distance." In other words, the relative signature distance, or $\Delta$, for working set signatures $S_1$ and $S_2$ is defined as:

$$\Delta = \frac{|S_1 \oplus S_2|}{|S_1 + S_2|}.$$

If the working set signatures are very similar, the relative signature distance $\Delta$ is close to zero. And if the working set signatures are very different the relative signature distance $\Delta$ is close to one. A threshold value $\Delta_{th}$ of the relative signature distance is used to detect working set, and thus phase, changes. In one embodiment, the threshold value $\Delta_{th}$ of 0.125 is used to determine working set changes. Relative signature values generally at or above this value indicate working set changes, whereas relative signature values under the threshold are indicative of recurring working sets. The threshold value was obtained experimentally by comparison with several benchmarks Other threshold values can be used and are intended to be included within the scope of the inventive subject matter.

A specific implementation used to measure relative signature distance employs two signature registers. One signature register is used to hold the signature for the current window, and the second signature register is used to hold the signature for the previous window. In this implementation the relative signature distance is represented by the ratio X/N, i.e., the exclusive-OR to the inclusive-OR of the signatures. Initially, X=N=count of ones in the previous signature. For each signature access, both the previous and current signature values are read. If previous=0 and current=0, then both X and N are incremented. If previous=0 and current=1, then nothing is done. If previous=1 and current=0, then the bit in the previous signature is cleared and X is decremented. The case of previous=1 and current=1 should not happen. At the end of the interval, preferably hardware (but also software) can find the relative signature distance X/N, or at least approximate it by shifting and comparing, when the threshold is a power of two. In this example, hardware is used to reduce software overhead, among other things. Other implementations are contemplated and are intended to be within the scope of the inventive subject matter.

Figure 4:
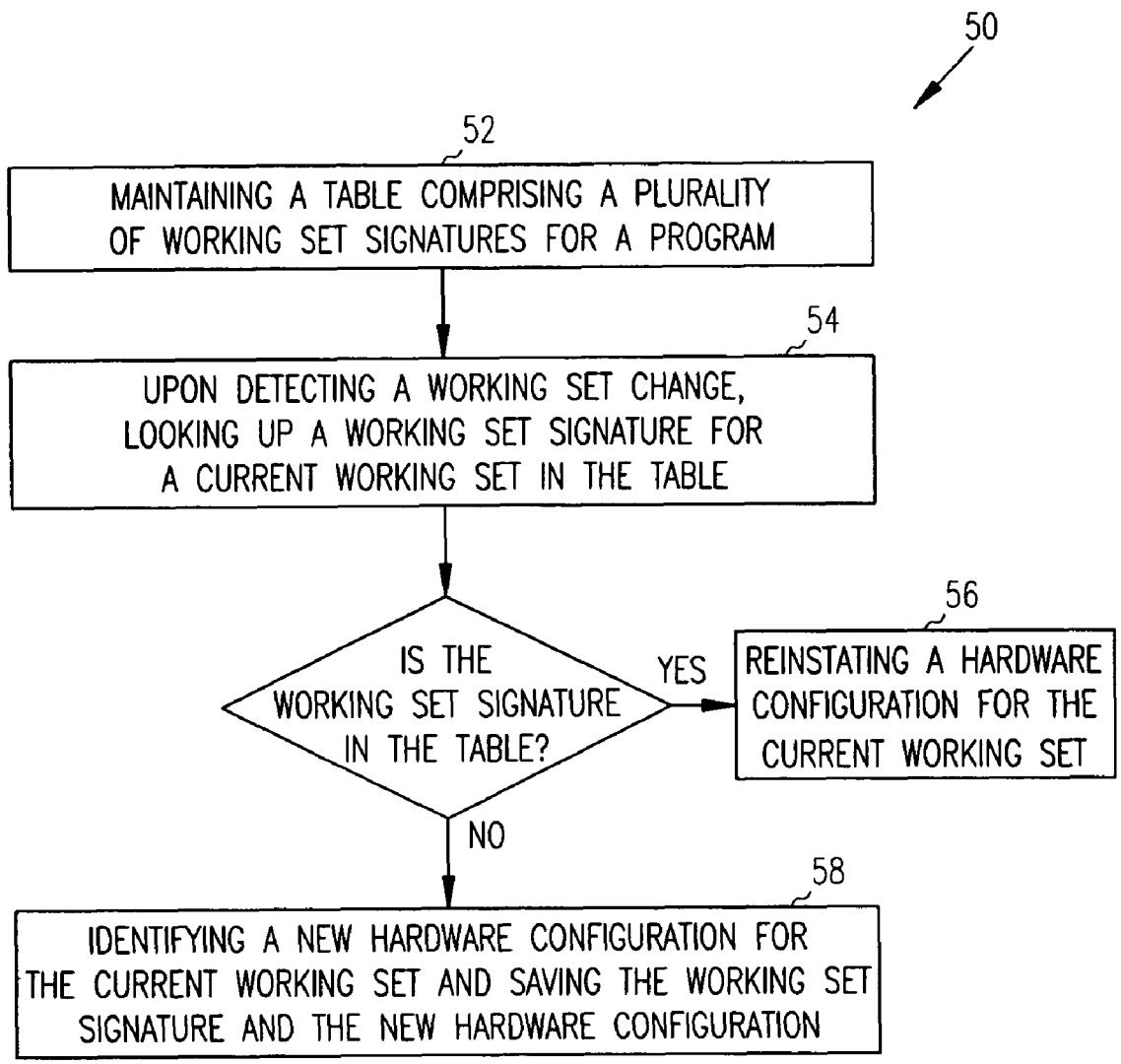
FIG. 4 is a flow chart of one example of reconfiguring system resources based on a representation of the program working set.

One application of working set signatures is used to reconfigure system resources, e.g., hardware, based on information provided by the working set signature. The reconfiguration of resources can be done for a variety of reasons, including optimizing power and performance of the system for a given working set. One method is illustrated in the flow chart of FIG. 4. In general, the method 50 includes maintaining a table having working set signatures for a program 52. Upon detecting a working set change, such as described above, the method includes looking up the current working set in the table 54. If the working set is in the table, the method proceeds to reinstating a hardware configuration for the current working set 56. If the working set is not in the table, the method identifies a new hardware configuration for the current working set, which is then saved into the table 58.

Figure 5:
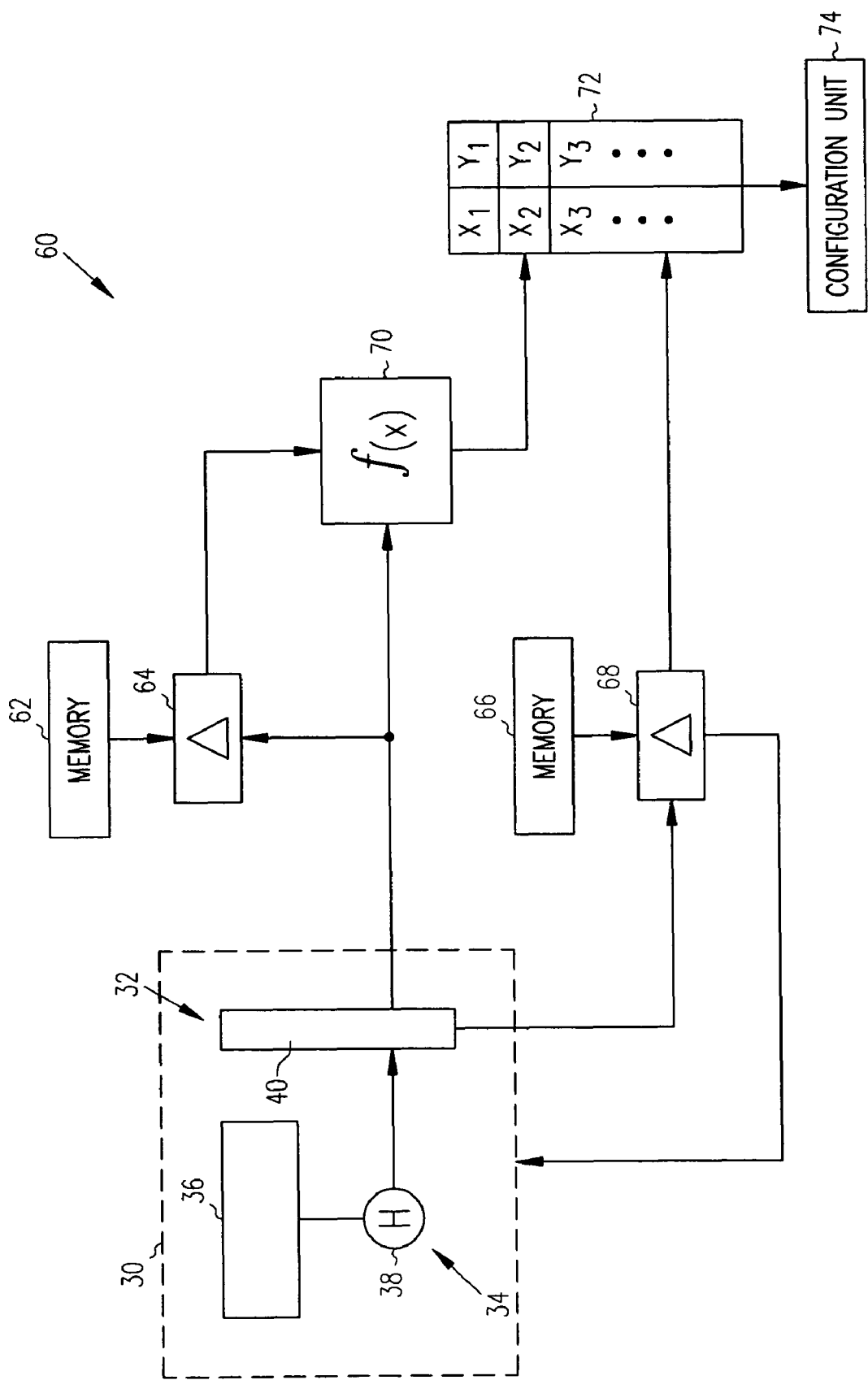
FIG. 5 is a block diagram of a specific example of a system to create configurations of system resources.

A block-diagram example making use of working set signatures to create various configurations of system resources is shown in FIG. 5. The example 60 uses mechanism 30, memory 62 coupled to relative signature distance unit 64, memory 66 coupled to relative signature distance unit 68, logic unit 70, table 72 and configuration unit 74. In one example, the process illustrated in the figure is separated into two groups. The first group designates a particular resource configuration to a given working set. The second group receives a working set and creates a resource configuration based on the analysis of the first group. The example is explained in more detail below.

During the first group, the mechanism 30 is used to develop working set signatures 40 using working set elements 36, a hash function in hash unit 34 and a data structure 32. The working set signature 40 provided to logic unit 70. Logic unit 70 uses the working set signature to determine a preferred configuration of system resources based on such information as the working set size. Logic unit 70 assigns the system resources based on an algorithm that can optimize size of resources and power consumption. The logic unit 70 includes a mechanism to calculate the size of the working set based on the working set signature, such as that described above. In an alternative embodiment, the working set 40 is compared to one or more previously stored working sets in memory 62 by a relative signature distance unit 64, or similar mechanism, that calculates whether the working set 40 is similar to that or those already in memory 62. The memory may be populated with signatures that have been previously processed by logic unit 70. If the working set signature is significantly different from a stored working set signature, the unit 64 enables logic unit 70 to perform its functions. If the working set signature is not significantly different from the one already stored in memory, system resources are saved by not operating logic unit 70.

Logic unit 70 assigns a preferred system resources code to the working set signature, and stores the two in table 72. The preferred resources code is related to, or corresponds with, a particular system configuration that can optimize power and performance of the system. By comparing a working set signature, working set, or another representation of the working set to the same or similar stored in the table with its corresponding system resources code, unit 74 can be used to set a particular system configuration. An example of this described with respect to the second group.

In the second group, the example 60 uses the working set signature to set a particular system configuration. The working set signature 40 from mechanism 30 is provided to relative signature distance unit 68. Unit 68 compares the current working set signature 40 to a previously sampled working set signature stored in memory 66. The stored signature can be the latest sampled signature or another signature from the current working set. Using the methods described above, unit 68 is used to detect a change in working sets. If there is no significant difference, another working set is analyzed. If there is a significant difference, the working set signature 40 is passed to table 72. The working set signature 40 is compared to the stored working set signatures in table 72 to determine its corresponding preferred resources code. The preferred resources code can be provided to configuration unit 74 that will reconfigure the system to correspond with the code. Meanwhile, another working set is analyzed. In one example, another working set is analyzed about every 100,000 instructions.

The systems, formulas and methods described in this disclosure can be implemented with hardware, software, or a combination of the two. For example, software can be used to perform higher-level configuration decisions, and hardware can be used to collect working set signatures, and, possibly, perform some of the lower level analysis. Other configurations are acceptable and are contemplated to be within the scope of the inventive subject matter. One example includes a virtual machine monitor, which is a layer of software designed concurrently with the hardware implementation. This software can be hidden from all conventional software and can be developed as part of the hardware design. Another example is to use low-level operating system software. This can require the addition of implementation dependent code into the operating system. Still another example is that microcode can reside in read-only-memory (ROM), but there is also used some hidden memory for maintaining data structures, or the like, such as a phase table. Still another example is a special purpose co-processor for managing hardware configuration.

The present inventive subject matter has now been described with reference to several embodiments. The foregoing detailed description and examples have been given for clarity of understanding only. Those skilled in the art will recognize that many changes can be made in the described embodiments without departing from the scope and spirit of the invention. Thus, the scope of the present disclosure should not be limited to the exact details and structures described herein, but rather by the appended claims and equivalents.

What is claimed is:

1. An apparatus comprising:
    a processing unit of a processor;
    a memory coupled to the processor; and
    an instruction set operable on the processing unit of the processor and including instructions:
        to instantiate a data structure in the memory to collect a representation of a working set; and
        to define a hash unit operable on the processing unit to map a plurality of working set elements into the data structure using a hash function,
        wherein, in a program, the working set $W(t_i, \tau)$ for i=1, 2..., where i is an integer, is a set of distinct memory segments $\{s_1, s_2 \ldots s_\omega\}$ accessed over the $i^{th}$ window of size $\tau$ within a time interval $t_i$;
        wherein the window is a sequence of $\tau$ consecutive memory accesses;
        wherein the working set size is $\omega$, the cardinality of the set of unique segments that are accessed by members of the window.

2. The apparatus of claim 1 wherein the data structure is a $2^n \times m$ bit table, where n is a number of bit table entries and m is a width of the bit table.

3. The apparatus of claim 2 wherein m is in the range of 1 to 64.

4. The apparatus of claim 2 wherein m=1.

5. The apparatus of claim 2 wherein n is in the range of 1 to 20.

6. The apparatus of claim 1 wherein the data structure is a $2^n$-bit vector.

7. The apparatus of claim 6 wherein n=1.

8. A computerized method of creating a representation of a working set, the computerized method comprising:
    mapping a plurality of working set elements into fields of a data structure using a hash function,
    wherein, in a program, the working set $W(t_i, \tau)$ for i=1, 2..., where i is an integer, is a set of distinct memory segments $\{s_1, s_2 \ldots s_\omega\}$ accessed over the $i^{th}$ window of size $\tau$ within a time interval $t_i$;
    wherein the window is a sequence of $\tau$ consecutive memory accesses;
    wherein the working set size is $\omega$, the cardinality of the set of unique segments that are accessed by members of the window.

9. The computerized method of claim 8 wherein the mapping is performed for a fixed interval of program execution.

10. The computerized method of claim 9 wherein the data structure is reset prior to each fixed interval of program execution.

11. The computerized method of claim 10 further comprising saving the fields of the data structure prior to resetting the data structure.

12. A computerized method of creating a representation of a working set, the computerized method comprising:
    executing a program for a fixed interval, the program comprising instructions identified by a program counter;
    performing a hash function on the program counter to create a hash value for each instruction executed during the fixed interval; and updating a field of a table indexed by the hash value wherein the table represents the working set, wherein, in a second program, the working set $W(t_i, \tau)$ for $i=1, 2 \ldots$, where i is an integer, is a set of distinct memory segments $\{s_1, s_2 \ldots s_\omega\}$ accessed over the $i^{th}$ window of size $\tau$ within a time interval $t_i$;

wherein the window is a sequence of $\tau$ consecutive memory accesses;

wherein the working set size is $\omega$, the cardinality of the set of unique segments that are accessed by members of the window.

13. A computer system comprising:
a bus;
a memory coupled to the bus; and
a processor coupled to the memory and the bus; the processor comprising:
   a data structure to collect a representation of a working set; and
   a hash unit to map a plurality of working set elements into the data structure using a hash function,
wherein, in a program, the working set $W(t_i, \tau)$ for $i=1, 2 \ldots$, where i is an integer, is a set of distinct memory segments $\{s_1, s_2 \ldots s_\omega\}$ accessed over the $i^{th}$ window of size $\tau$ within a time interval $t_i$;
wherein the window is a sequence of $\tau$ consecutive memory accesses;
wherein the working set size is $\omega$, the cardinality of the set of unique segments that are accessed by members of the window.

14. The computer system of claim 13, further comprising:
an instruction retirement unit; and
wherein the data structure and the hash unit are part of an instruction retirement unit.

15. A computerized method of estimating size of a working set, the method comprising:
   receiving a signature for a working set; and
   estimating the size of the working set based on the size of the signature,
   wherein, in a program, the working set $W(t_i, \tau)$ for $i=1, 2 \ldots$, where i is an integer, is a set of distinct memory segments $\{s_1, s_2 \ldots s_\omega\}$ accessed over the $i^{th}$ window of size $\tau$ within a time interval $t_i$;
   wherein the window is a sequence of $\tau$ consecutive memory accesses;
   wherein the working set size is $\omega$, the cardinality of the set of unique segments that are accessed by members of the window.

16. The computerized method of claim 15 wherein the estimating is performed with the following function:

$$K = \log(1-f) \Big/ \log\left(1 - \frac{1}{2^n}\right),$$

wherein K is the number of unique working set elements, $2^n$ is the number of entries in the signature, and f is the fraction of 1's in the signature.

17. A computerized method of detecting working set changes, the method comprising:
   comparing a current working set signature to a previous working set signature;
   calculating a relative signature distance between the current working set signature and the previous working set signature; and
   identify a working set change when the relative signature distance exceeds a predetermined threshold,
   wherein, in a program, the working set $W(t_i, \tau)$ for $i=1, 2 \ldots$, where i is an integer, is a set of distinct memory segments $\{s_1, s_2 \ldots s_\omega\}$ accessed over the $i^{th}$ window of size $\tau$ within a time interval $t_i$;
   wherein the window is a sequence of $\tau$ consecutive memory accesses;
   wherein the working set size is $\omega$, the cardinality of the set of unique segments that are accessed by members of the window.

18. The computerized method of claim 17 wherein the working set change indicates a phase change in a program.

19. A computerized method of identifying a recurring working set, the method comprising:
   comparing a current working set signature to one or more previous working set signatures;
   calculating a relative signature distance between the current working set signature and the one or more previous working set signatures; and
   identifying a recurring working set when the relative signature distance between the current working set signature and one of the previous working set signatures is within a predetermined threshold,
   wherein, in a program, the working set $W(t_i, \tau)$ for $i=1, 2 \ldots$, where i is an integer, is a set of distinct memory segments $\{s_1, s_2 \ldots s_\omega\}$ accessed over the $i^{th}$ window of size $\tau$ within a time interval $t_i$;
   wherein the window is a sequence of $\tau$ consecutive memory accesses;
   wherein the working set size is $\omega$, the cardinality of the set of unique segments that are accessed by members of the window.

20. The computerized method of claim 19 further comprising identifying a new working set when the relative signature distance between the current working set signature the one or more previous working set signatures exceeds a predetermined threshold.

21. The computerized method of claim 20 further comprising maintaining a table of the one or more previous working set signatures.

22. A hardware reconfiguration method comprising:
   maintaining a table comprising a plurality of working set signatures for a program;
   upon detecting a working set change, looking up a working set signature for a current working set in the table;
   if the working set signature is in the table, reinstating a hardware configuration for the current working set; and
   if the working set signature is not in the table; identifying a new hardware configuration for the current working set and saving the working set signature and the new hardware configuration,
   wherein, in a program, the working set $W(t_i, \tau)$ for $i=1, 2 \ldots$, where i is an integer, is a set of distinct memory segments $\{s_1, s_2 \ldots s_\omega\}$ accessed over the $i^{th}$ window of size $\tau$ within a time interval $t_i$;
   wherein the window is a sequence of $\tau$ consecutive memory accesses;
   wherein the working set size is $\omega$, the cardinality of the set of unique segments that are accessed by members of the window.

23. The method of claim 22 wherein the working set change indicates a phase change in a program.

* * * * *